United States Patent
Ripley (10) Patent No.: US 6,780,276 B2
(45) Date of Patent: Aug. 24, 2004

(54) GAP ADJUSTER FOR LAMINATING ROLLS

(75) Inventor: Scott Alan Ripley, River Falls, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 92 days.

(21) Appl. No.: 10/115,777

(22) Filed: Apr. 3, 2002

(65) Prior Publication Data

US 2003/0188832 A1 Oct. 9, 2003

(51) Int. Cl.$^7$ .............................................. B32B 31/00
(52) U.S. Cl. ........................ 156/324; 156/555; 156/582
(58) Field of Search ........................ 156/64, 324, 358, 156/555, 580, 582, 583.1; 100/155 R, 160, 176

(56) References Cited

U.S. PATENT DOCUMENTS

| | | |
|---|---|---|
| 3,178,041 A | 4/1965 | Wheat et al. |
| 3,285,112 A | 11/1966 | Dale et al. |
| 3,861,259 A | 1/1975 | Hitch |

(List continued on next page.)

FOREIGN PATENT DOCUMENTS

| | | |
|---|---|---|
| AT | 314 323 B | 3/1974 |
| BE | 1007774 A3 | 10/1995 |
| DE | 19 28 110 A | 12/1970 |
| DE | 26 10 628 A | 9/1977 |
| DE | 33 43 811 A | 6/1985 |
| DE | 94 00 890.6 U1 | 3/1994 |
| EP | 0 654 347 A1 | 11/1994 |
| FR | 2 456 613 A | 12/1980 |
| GB | 1 084 597 A | 9/1967 |
| GB | 2101098 A | 1/1983 |
| JP | 55-98040 | 7/1980 |
| JP | 57-93854 | 6/1982 |
| JP | 62-244830 | 10/1987 |
| JP | 403-128851 | 5/1991 |
| JP | 403-128853 | 5/1991 |
| JP | 96335462 A | 12/1996 |
| JP | 10-166014 | 6/1998 |
| JP | 11 273663 A | 10/1999 |
| JP | 11 297314 A | 10/1999 |
| JP | 99292327 A | 10/1999 |

OTHER PUBLICATIONS

U.S. patent application Ser. No. 10/115,513, Behymer, filed Apr. 3, 2002.

U.S. patent application Ser. No. 10/115,778, Hirsch, filed Apr. 3, 2002.

U.S. patent application Ser. No. 10/116,323, Ripley, filed Apr. 3, 2002.

U.S. patent application Ser. No. 10/115,523, Ripley et al., filed Apr. 3, 2002.

(List continued on next page.)

Primary Examiner—James Sells
(74) Attorney, Agent, or Firm—Philip Y. Dahl (57) ABSTRACT

An apparatus and method for lamination are provided, which are advantageously used in intermittent lamination and fixed-gap lamination, the apparatus comprising first and second laminating rollers defining a laminating gap therebetween and at least one gapping block positioned between the first and second rollers such that the gapping block determines and maintains a minimum gap width. The gapping block comprises a rigid gapping block body, which may be adjustable in width, and four or more load wheels rotatably attached to the gapping block body which ride on a portion of the first and second rollers.

62 Claims, 3 Drawing Sheets

U.S. PATENT DOCUMENTS

| | | |
|---|---|---|
| 3,946,920 A | 3/1976 | Jordan et al. |
| 4,143,871 A | 3/1979 | Blessing |
| 4,168,772 A | 9/1979 | Eberle |
| 4,236,814 A | 12/1980 | Tonkin |
| 4,360,260 A | 11/1982 | Eloranta et al. |
| 4,381,596 A | 5/1983 | Simonton et al. |
| 4,534,549 A | 8/1985 | Eberle |
| 4,591,139 A | 5/1986 | Engelbart |
| 4,676,862 A | 6/1987 | Kuehnert |
| 4,728,093 A | 3/1988 | Eberle |
| 4,784,380 A | 11/1988 | Eberle |
| 4,887,858 A | 12/1989 | Gazzarrini |
| 5,048,182 A | 9/1991 | Robbins, III |
| 5,061,337 A * | 10/1991 | Fraser .................. 156/351 |
| 5,078,375 A | 1/1992 | Steidinger |
| 5,456,871 A | 10/1995 | Harada et al. |
| 5,556,499 A | 9/1996 | Clough |
| 5,596,897 A | 1/1997 | Payne, Jr. et al. |
| 5,762,753 A | 6/1998 | Clough |
| 5,783,024 A | 7/1998 | Forkert |
| 5,791,185 A | 8/1998 | Bodnar |
| 5,989,747 A | 11/1999 | Tanaka et al. |
| 6,007,660 A | 12/1999 | Forkert |
| 6,059,003 A * | 5/2000 | Wittkopf .................. 156/555 |
| 6,066,409 A | 5/2000 | Ronne et al. |
| 6,159,327 A | 12/2000 | Forkert |
| 6,241,839 B1 | 6/2001 | Yoshino et al. |
| 6,347,585 B1 | 2/2002 | Kiamco et al. |
| 6,405,779 B1 * | 6/2002 | Wittkopf .................. 156/555 |
| 2002/0014509 A1 | 2/2002 | Kitai et al. |

OTHER PUBLICATIONS

U.S. patent application Ser. No. 10/115,731, Mlinar, filed Apr. 3, 2002.

U.S. patent application Ser. No. 10/115,516, Mlinar et al., filed Apr. 3, 2002.

U.S. patent application Ser. No. 10/115,733, Mlinar, filed Apr. 3, 2002.

U.S. patent application Ser. No. 10/115,556, Eaton et al., filed Apr. 3, 2002.

U.S. patent application Ser. No. 10/115,537, Schukar et al., filed Apr. 3, 2002.

U.S. patent application Ser. No. 10/446,485, filed May 28, 2003. Roll–Good Fuel Cell Fabrication Processes, Equipment, and Articles Produced From Same.

* cited by examiner

GAP ADJUSTER FOR LAMINATING ROLLS

FIELD OF THE INVENTION

This invention relates to method of lamination and an apparatus comprising first and second laminating rollers defining a laminating gap therebetween and at least one gapping block positioned between the first and second rollers such that the gapping block determines and maintains a minimum gap width. The gapping block comprises a rigid gapping block body, which may be adjustable in width, and four or more load wheels rotatably attached to the gapping block body which ride on a portion of the first and second rollers.

BACKGROUND OF THE INVENTION

U.S. Pat. No. 6,347,585 discloses a gap adjusting device for a rotary press comprising two rollers separated by an adjustable eccentric member.

U.S. Pat. No. 5,456,871 discloses a system for adjusting a calendaring gap which employs load measuring units and active feedback, typically mediated by a microprocessor.

U.S. Pat. App. Pub. No. US2002/0014509 A1 discloses a nipping roller gap adjusting device having a minimum gap setting means which includes an opposing pair of stops, one attached to a moving assembly that bears a roller and the other attached to the apparatus frame.

SUMMARY OF THE INVENTION

Briefly, the present invention provides an apparatus comprising first and second rollers defining a gap therebetween and at least one gapping block positioned between the first and second rollers such that the gapping block determines and maintains a minimum gap width. The gapping block comprises a rigid gapping block body and four or more load wheels rotatably attached to the gapping block body and is positioned between the first and second rollers such that at least two load wheels contact each roller. In a further embodiment, the width of the gapping block may be adjustable.

In another aspect, the present invention provides a method of laminating two or more sheet materials together by passing the sheets concurrently into a gap between a first roller and a second roller of a laminating apparatus, which apparatus additionally comprises at least one gapping block positioned between the first and second rollers such that the gapping block determines and maintains a minimum gap width.

In another aspect, the present invention provides a method of laminating two or more sheet materials together by passing the sheets concurrently into a gap between a first roller and a second roller of a laminating apparatus, which apparatus additionally comprises at least one gapping block positioned between the first and second rollers such that the gapping block determines and maintains a constant gap width which remains constant throughout the lamination.

In another aspect, the present invention provides an adjustable gapping block comprising: a first gapping block body element having two or more load wheels rotatably attached; a second gapping block body element having two or more load wheels rotatably attached, where the second gapping block body element is assembled with said first gapping block body element so as to allow linear motion of the two elements relative to each other in the direction of gapping block body width, and where at least one surface of either gapping block body element is canted with respect to a facing surface of the other gapping block body element when so assembled; a wedge disposed between the facing surfaces; and an adjusting screw to determine the position of the wedge between the facing surfaces, thereby determining the gapping block body width.

In this application, "to laminate" means to bond together two or more sheet materials.

It is an advantage of the present invention to provide a method of lamination which prevents damage to the continuous web during intermittent lamination of non-continuous sheets to a continuous web.

DETAILED DESCRIPTION OF PREFERRED EMBODIMENTS

With reference to FIGS. 1–4, a gapping block according to the present invention comprises a gapping block body which comprises a first gapping block body element 10 and a second gapping block body element 20. Two load wheels 31, 32 are rotatably attached to the first gapping block body element 10. Two load wheels 33, 34 are rotatably attached to the second gapping block body element 20. Additional load wheels may be mounted to either gapping block body element. Alternately, where no adjustment to gapping block body width will be needed, the gapping block body can be a single body element to which four or more load wheels are mounted. Arrow A indicates the dimension which represents body width of the gapping block. In use with a pair of rollers, the gapping block body width is the linear dimension of the gapping block body measured in the direction parallel to the measurement of the gap width between the first and second rollers. In use, motion of the gapping block body elements in a direction perpendicular to the gapping block body width must be prevented. First gapping block body element 10 may comprise arms 15 which prevent motion of second gapping block body element 20 in one or more direction perpendicular to the gapping block body width. In addition, one or more lateral constraints attached to or forming a part of the apparatus frame (shown in FIG. 5, discussed below) may prevent motion of second gapping block body element 20 relative to first gapping block body element 10 in one or more directions perpendicular to the gapping block body width. First and second gapping block body elements 10, 20 may be bolted to one or more lateral constraints after adjustment of the gapping block body width through tapped holes 12, 22.

First gapping block body element 10 and second gapping block body element 20 comprise facing surfaces 11 and 21, respectively. One or both of facing surfaces 11 and 21 is canted. By interaction with surfaces 11 and 21, wedge 40 may be used to adjust gapping block body width. Adjusting screw 41 may be used to alter the position of wedge 40 and thereby the gapping block body width. In one embodiment, adjusting screw 41 has threaded shaft which engages a tapped hole in a lateral constraints attached to or forming a part of the apparatus frame (shown in FIG. 5, discussed below). Typically, first gapping block body element 10 is bolted to one or more lateral constraints through tapped holes 12, gapping block body width is adjusted by means of adjusting screw 41, and then second gapping block body element 20 is bolted to one or more lateral constraints through tapped holes 22.

Figure 1:
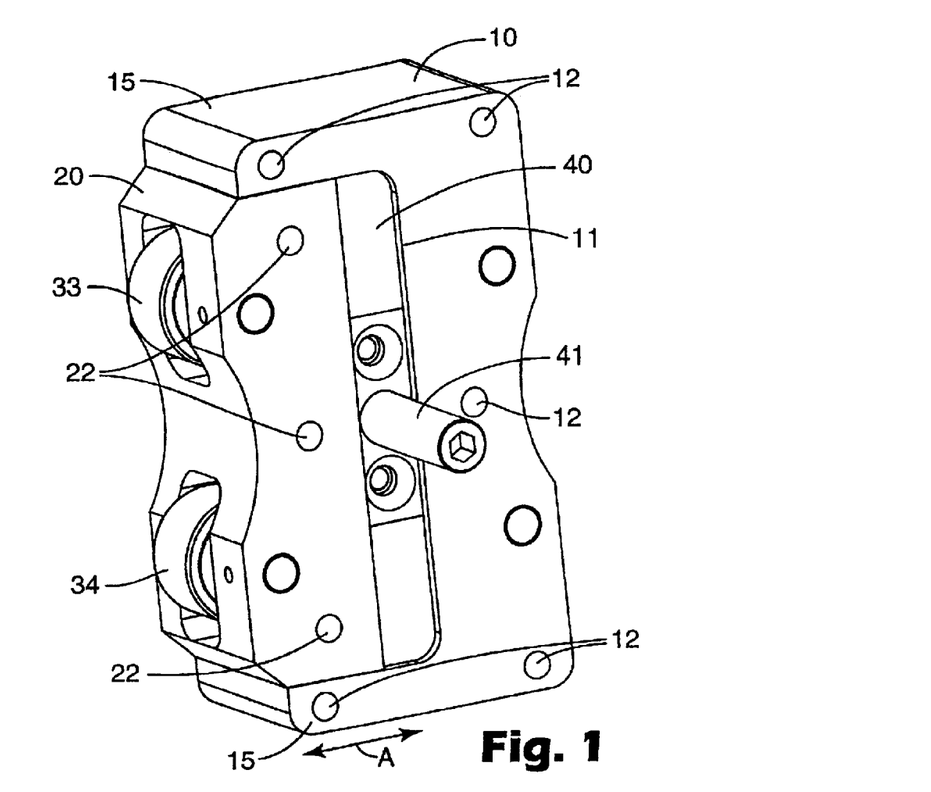
FIGS. 1 and 2 illustrate a gapping block according to the present invention.
Figure 2:
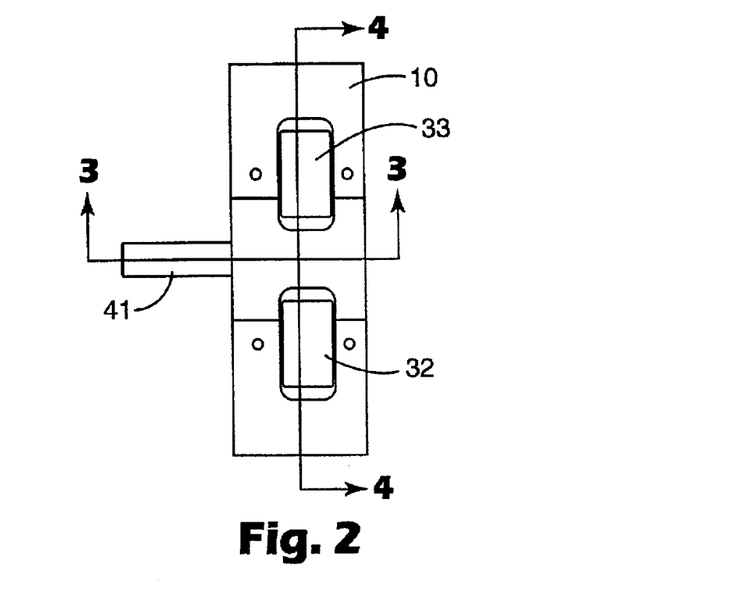
Figure 3:
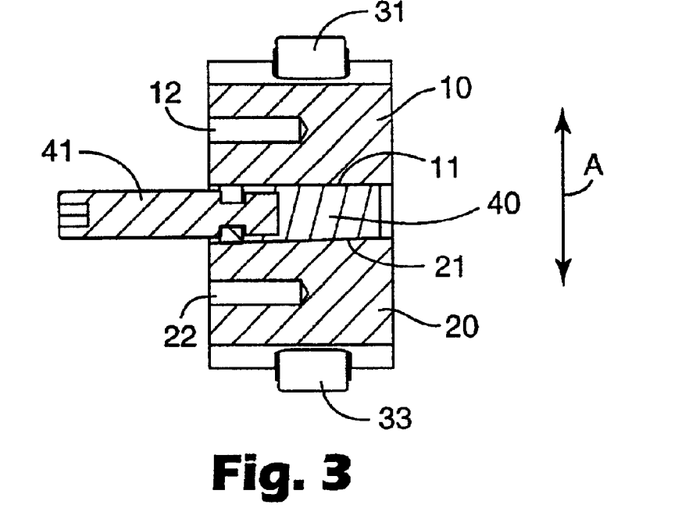
FIGS. 3 and 4 are cross-sections of the gapping block depicted in FIGS. 1 and 2.
Figure 4:
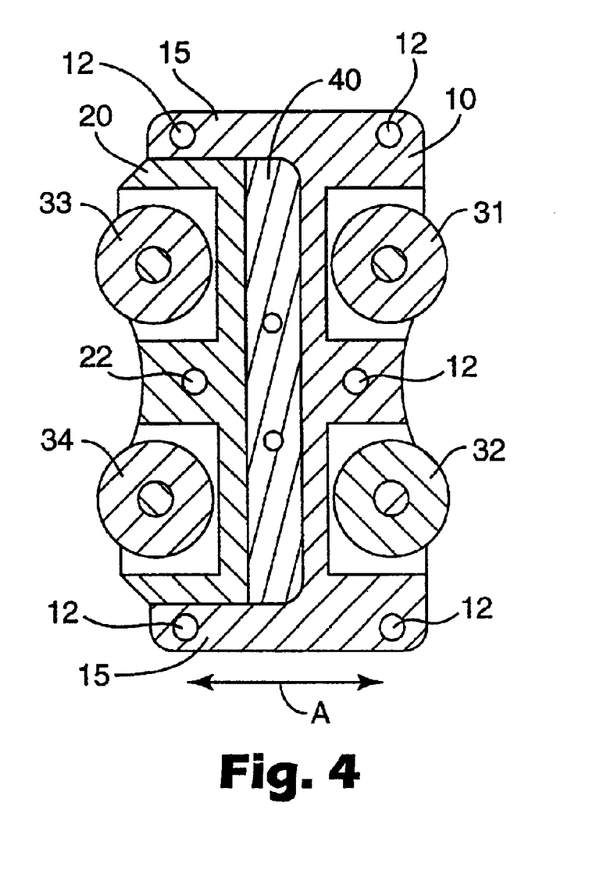
Figure 5:
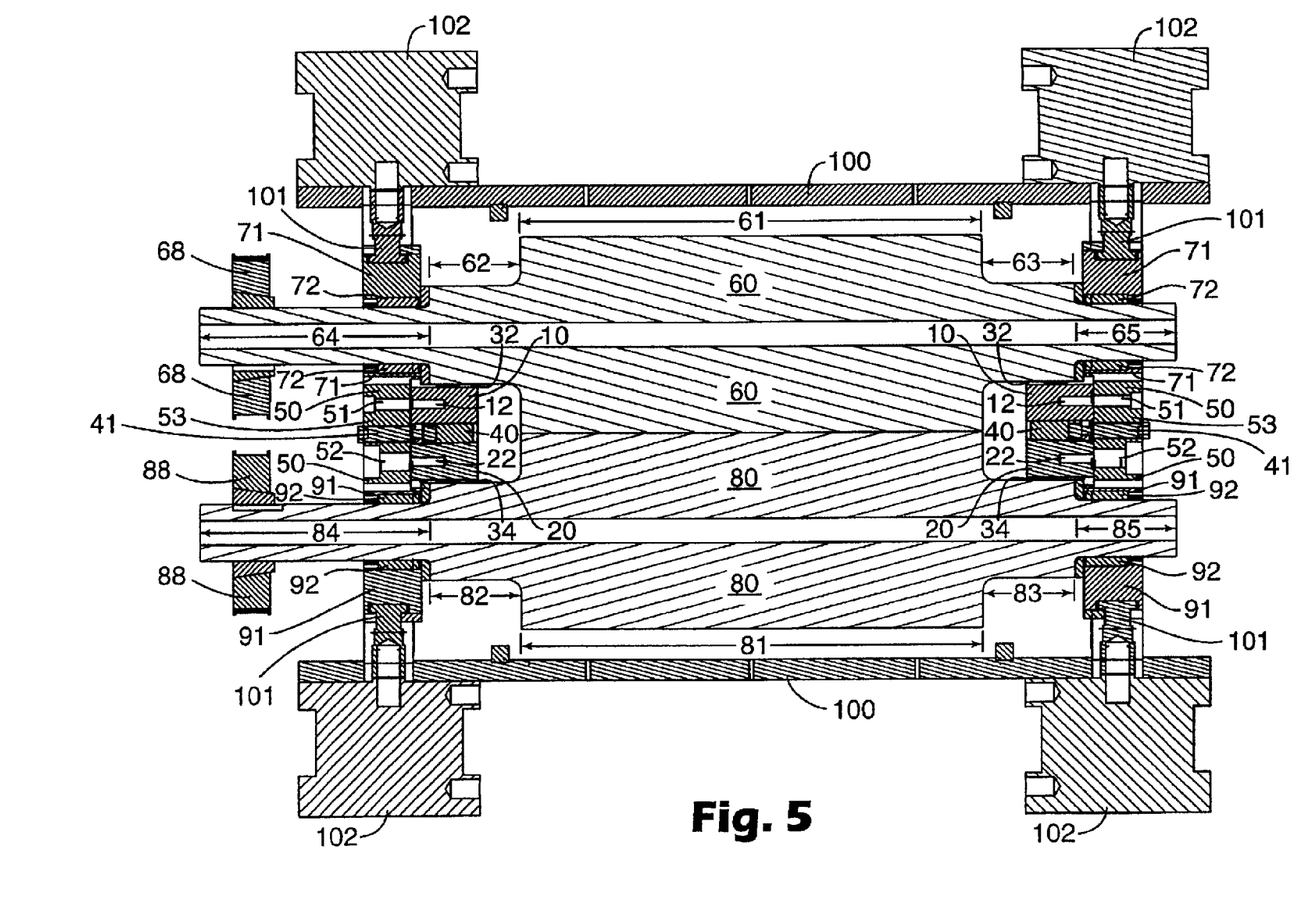
FIG. 5 is a cross-section of an apparatus according to the present invention taken through the axes of the two rollers of the apparatus.

With reference to FIG. 5, an apparatus according to the present invention comprises gapping blocks as described above comprising first gapping block body element 10, second gapping block body element 20, load wheels 32, 34, wedge 40, and adjusting screw 41. Lateral constraints 50 prevent motion of second gapping block body element 20 relative to first gapping block body element 10 in a direction perpendicular to the gapping block body width. Lateral constraints 50 are attached to the apparatus frame by connections not shown. First gapping block body elements 10 may be bolted to lateral constraints 50 by through holes 51 and tapped holes 12. Adjusting screws 41 have threaded shafts which engages tapped holes 53 in lateral constraints 50. Gapping block body width is adjusted by means of the action of adjusting screws 41 on wedges 40. Second gapping block body elements 20 may then be bolted to lateral constraints 50 by through holes 52 and tapped holes 22.

The apparatus additionally comprises a first roller 60 comprising a pressing zone 61 having a radius $r_{p1}$ and two gapping block zones 62, 63 having a radius $r_{g1}$. As shown, the first roller additionally comprises axle portions 64, 65 which interact with bearing surface mechanisms 72. Second roller 80 comprising a pressing zone 81 having a radius $r_{p2}$ and two gapping block zones 82, 83 having a radius $r_{g2}$. Typically, $r_{p1}$ equals $r_{p2}$ and $r_{g1}$ equals $r_{g2}$. As shown, the first roller additionally comprises axle portions 84, 85 which interact with bearing surface mechanisms 92. A narrow laminating gap is formed between first roller 60 and second roller 80, which are not in contact. The laminating gap of the embodiment shown in FIG. 5 is too narrow to be clearly depicted. Either or both of first roller 60 and second roller 80 may be driven by known means such as motors and the like. Typically both are driven. Typically first roller 60 and second roller 80 are geared together so that they have the same speed at the gap. In one embodiment, first roller 60 and second roller 80 are driven by a belt drive mechanism interacting with pulleys 68 and 88.

Bearings comprise bearing housings 71, 91 and bearing surface mechanisms 72, 92 which are of known types such as ball bearings, roller bearings, needle bearings, and the like. Bearing housings 71, 91 are attached to the apparatus frame 100 such that pressure can be brought or maintained on bearing housings 71, 91 which tends to bring together first and second rollers 60, 80. The bearing housings may be fixedly attached to frame 100 or attached by means of pneumatic or hydraulic pistons 101 and cylinders 102, as shown. Bearing mechanisms may form a part of drive mechanisms for either or both rollers.

In the laminating method according to the present invention, two or more sheet materials are pressed together by passing them concurrently into a narrow gap between first roller 60 and second roller 80. Typically one or both of first roller 60 and second roller 80 are driven; more typically both. Heat, solvents or adhesives may be applied to one or more layers to aid in bonding. First roller 60 and second roller 80 may be heated by any suitable method but are typically internally heated by a method such as electrical heating or circulation of hot air, water or oil.

The apparatus and method according to the present invention are used to advantage where intermittent lamination is desired, i.e., where one or more of the layers to be laminated is not continuously present in the laminating gap during lamination. In this case, the product may be a continuous web with non-continuous patches of additional sheet materials laminated thereto. In the case of intermittent lamination, the continuous web could be crushed or damaged if the full laminating pressure were applied when the non-continuous sheet material was not present in the gap. This damage to the continuous web may be prevented by use of the method and apparatus according to the present invention, which maintains a minimum gap width. In addition, if the full laminating pressure were applied when the non-continuous sheet material was not present in the gap, the leading edges of the intermittent laminate may be rounded during the laminating process, which may be avoided by use of the method and apparatus according to the present invention.

The apparatus according to the present invention has the additional advantage that bearing clearance in the roller bearings is removed from consideration in determining gap width, and therefore variation in bearing clearance is also removed from consideration. Variation in bearing clearance may be especially problematic where laminating rolls are heated. More accurate and consistent gap width may be set using the apparatus according to the present invention. In addition, the apparatus according to the present invention can be used for fixed-gap lamination, where the gap width is essentially constant throughout lamination. To achieve fixed-gap lamination, sufficient force must be applied to the rollers to overcome any resisting force generated by the materials to be laminated.

The apparatus and method according to the present invention are used to advantage in the lamination of catalyst decals to polymer electrolyte membranes, in particular membranes of sulfonated fluoropolymer membranes such as Nafion™ or Flemion™. Catalyst decals typically comprises a thin layer of a catalyst dispersion on a backing layer. After lamination of the catalyst dispersion to the polymer electrolyte membrane, the decal backing layer is removed. The apparatus and method according to the present invention are used to advantage with cast membranes of delicate or thin films, typically 100 micrometers in thickness or less, more typically 50 micrometers in thickness or less, and more typically 30 micrometers in thickness or less.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. An apparatus comprising first and second rollers, said first and second rollers being essentially parallel and said first and second rollers defining a gap therebetween having a gap width;

said apparatus additionally comprises at least one gapping block comprising a rigid gapping block body and four or more load wheels rotatably attached to said gapping block body;

wherein said gapping block is positioned between said first and second rollers such that at least two load wheels contact each roller, the gapping block thereby determining and maintaining a minimum gap width.

2. The apparatus according to claim 1 comprising two gapping blocks positioned between said first and second rollers such that at least two load wheels of each gapping block contact each roller, the gapping blocks thereby determining and maintaining a minimum gap width; wherein the two gapping blocks are separated from each other by a given gap length.

3. The apparatus according to claim 1 wherein each of said rollers comprise at least one pressing zone wherein said roller has a radius $r_p$, and at least one gapping block zone wherein said roller has a radius $r_g$, wherein said load wheels of said gapping blocks contact said roller at said gapping zone, and wherein $r_p$ is not equal to $r_g$.

4. The apparatus according to claim 3 wherein $r_p$ is greater than $r_g$.

5. The apparatus according to claim 2 wherein each or said rollers comprise at least one pressing zone wherein said roller has a radius $r_p$ and at least two gapping block zones wherein said roller has a radius $r_g$, wherein said load wheels of said gapping blocks contact said rollers at said gapping zones, and wherein $r_p$ is not equal to $r_g$.

6. The apparatus according to claim 5 wherein $r_p$ is greater than $r_g$.

7. The apparatus according to claim 5 wherein said rollers comprise one pressing zone located between two gapping block zones.

8. The apparatus according to claim 6 wherein said rollers comprise one pressing zone located between two gapping block zones.

9. The apparatus according to claim 6 wherein said rollers comprise one pressing zone located between two gapping block zones.

10. The apparatus according to claim 1 wherein said gapping block body has a gapping block body width, which is the linear dimension of the gapping block body measured in the direction parallel to the measurement of the gap width between the first and second rollers, wherein said gapping block body comprises means to adjust said gapping block body width.

11. The apparatus according to claim 10 wherein said gapping block body comprises:
   a first gapping block body element, wherein two or more load wheels are rotatably attached to said first gapping block body element;
   a second gapping block body element, wherein two or more load wheels are rotatably attached in said second gapping block body element, wherein said second gapping block body element is assembled with said first gapping block body element so as to allow linear motion of the two elements relative to each other in the direction of gapping block body width, and wherein at least one surface of either gapping block body element is canted with respect to a facing surface of the other gapping block body element when so assembled;
   a wedge disposed between said canted surface and said facing surface; and
   an adjusting screw to determine the position of said wedge between said canted surface and said facing surface, thereby determining the gapping block body width.

12. The apparatus according to claim 2 wherein each gapping block body has a gapping block body width, which is the linear dimension of the gapping block body measured in the direction parallel to the measurement of the gap width between the first and second rollers, wherein each gapping block body comprises means to adjust said gapping block body width.

13. The apparatus according to claim 12 wherein said gapping block body comprises:
   a first gapping block body element, wherein two or more load wheels are rotatably attached to said first gapping block body element;
   a second gapping block body element, wherein two or more load wheels are rotatably attached to said second gapping block body element, wherein said second gapping block body element is assembled with said first gapping block body element so as to allow linear motion of the two elements relative to each other in the direction of gapping block body width, and wherein at least one surface of either gapping block body element is canted with respect to a facing surface of the other gapping block body element when so assembled;
   a wedge disposed between said canted surface and said facing surface; and
   an adjusting screw to determine the position of said wedge between said canted surface and said facing surface, thereby determining the gapping block body width.

14. The apparatus according to claim 7 wherein each gapping block body has a gapping block body width, which is the linear dimension of the gapping block body measured in the direction parallel to the measurement of the gap width between the first and second rollers, wherein each gapping block body comprises means to adjust said gapping block body width.

15. The apparatus according to claim 14 wherein said gapping block body comprises:
   a first gapping block body element, wherein two or more load wheels are rotatably attached to said first gapping block body element;
   a second gapping block body element, wherein two or more load wheels are rotatably attached to said second gapping block body element, wherein said second gapping block body element is assembled with said first gapping block body element so as to allow linear motion of the two elements relative to each other in the direction of gapping block body width, and wherein at least one surface of either gapping block body element is canted with respect to a facing surface of the other gapping block body element when so assembled;
   a wedge disposed between said canted surface and said facing surface; and
   an adjusting screw to determine the position of said wedge between said canted surface and said facing surface, thereby determining the gapping block body width.

16. The apparatus according to claim 2 wherein each roller is rotatably supported by two or more roller bearings which comprise a bearing surface mechanism and a bearing housing; wherein each bearing housing is attached to an apparatus frame so as to maintain pressure on said bearing housings in a direction which urges together said first and second rollers.

17. The apparatus according to claim 7 wherein each roller is rotatably supported by two or more roller bearings which comprise a bearing surface mechanism and a bearing housing; wherein each bearing housing is attached to an apparatus frame so as to maintain pressure on said bearing housings in a direction which urges together said first and second rollers.

18. The apparatus according to claim 14 wherein each roller is rotatably supported by two or more roller bearings which comprise a bearing surface mechanism and a bearing housing; wherein each bearing housing is attached to an apparatus frame so as to maintain pressure on said bearing housings in a direction which urges together said first and second rollers.

19. The apparatus according to claim 15 wherein each roller is rotatably supported by two or more roller bearings which comprise a bearing surface mechanism and a bearing housing; wherein each bearing housing is attached to an apparatus frame so as to maintain pressure on said bearing housings in a direction which urges together said first and second rollers.

20. A method of laminating two or more sheet materials together by passing said materials concurrently into a gap between a first roller and a second roller of a laminating apparatus, said first and second rollers being essentially parallel and said first and second rollers defining a gap therebetween having a gap width;
wherein a gapping block is positioned between said first and second rollers, said gapping block comprising a rigid gapping block body and four or more load wheels rotatably attached to said gapping block body, wherein said gapping block is positioned such that at least two load wheels contact each roller, the gapping block thereby determining and maintaining a minimum gap width.

21. The method according to claim 20 wherein two gapping blocks are positioned between said first and second rollers such that at least two load wheels of each gapping block contact each roller, the gapping blocks thereby determining and maintaining a minimum gap width; wherein the two gapping blocks are separated from each other by a given gap length.

22. The method according to claim 20 wherein each of said rollers comprise at least one pressing zone wherein said roller has a radius $r_p$ and at least one gapping block zone wherein said roller has a radius $r_g$, wherein said load wheels of said gapping blocks contact said rollers at said gapping zone, and wherein $r_p$ is not equal to $r_g$.

23. The method according to claim 22 wherein $r_p$ is greater than $r_g$.

24. The method according to claim 21 wherein each of said rollers comprise at least one pressing zone wherein said roller has a radius $r_p$ and at least two gapping block zones wherein said roller has a radius $r_g$, wherein said load wheels of said gapping blocks contact said rollers at said gapping zones, and wherein $r_p$ is not equal to $r_g$.

25. The method according to claim 24 wherein $r_p$ is greater than $r_g$.

26. The method according to claim 24 wherein said rollers comprise one pressing zone located between two gapping block zones.

27. The method according to claim 25 wherein said rollers comprise one pressing zone located between two gapping block zones.

28. The method according to claim 25 wherein said rollers comprise one pressing zone located between two gapping block zones.

29. The method according to claim 20 wherein said gapping block body has a gapping block body width, which is the linear dimension of the gapping block body measured in the direction parallel to the measurement of the gap width between the first and second rollers, wherein said gapping block body comprises means to adjust said gapping block body width.

30. The method according to claim 29 wherein said gapping block body comprises:
a first gapping block body element, wherein two or more load wheels are rotatably attached to said first gapping block body element;
a second gapping block body element, wherein two or more load wheels are rotatably attached to said second gapping block body element, wherein said second gapping block body element is assembled with said first gapping block body element so as to allow linear motion of the two elements relative to each other in the direction of gapping block body width, and wherein at least one surface of either gapping block body element is canted with respect to a facing surface of the other gapping block body element when so assembled;
a wedge disposed between said canted surface and said facing surface; and
an adjusting screw to determine the position of said wedge between said canted surface and said racing surface, thereby determining the gapping block body width.

31. The method according to claim 21 wherein each gapping block body has a gapping block body width, which is the linear dimension of the gapping block body measured in the direction parallel to the measurement of the gap width between the first and second rollers, wherein each gapping block body comprises means to adjust said gapping block body width.

32. The method according to claim 31 wherein said gapping block body comprises:
a first gapping block body element, wherein two or more load wheels are rotatably attached to said first gapping block body element;
a second gapping block body element, wherein two or more load wheels are rotatably attached to said second gapping block body element, wherein said second gapping block body element is assembled with said first gapping block body element so as to allow linear motion of the two elements relative to each other in the direction of gapping block body width, and wherein at least one surface of either gapping block body element is canted with respect to a facing surface of the other gapping block body element when so assembled;
a wedge disposed between said canted surface and said facing surface; and
an adjusting screw to determine the position of said wedge between said canted surface and said facing surface, thereby determining the gapping block body width.

33. The method according to claim 26 wherein each gapping block body has a gapping block body width, which is the linear dimension of the gapping block body measured in the direction parallel to the measurement of the gap width between the first and second rollers, wherein each gapping block body comprises means to adjust said gapping block body width.

34. The method according to claim 33 wherein said gapping block body comprises:
a first gapping block body element, wherein two or more load wheels are rotatably attached to said first gapping block body element;
a second gapping block body element, wherein two or more load wheels are rotatably attached to said second gapping block body element, wherein said second gapping block body element is assembled with said first gapping block body element so as to allow linear motion of the two elements relative to each other in the direction of gapping block body width, and wherein at least one surface of either gapping block body element is canted with respect to a facing surface of the other gapping block body element when so assembled;

a wedge disposed between said canted surface and said facing surface; and an adjusting screw to determine the position of said wedge between said canted surface and said facing surface, thereby determining the gapping block body width.

35. The method according to claim 21 wherein each roller is rotatably supported by two or more roller bearings which comprise a bearing surface mechanism and a bearing housing; wherein each bearing housing is attached to an apparatus frame so as to maintain pressure on said bearing housings in a direction which urges together said first and second rollers.

36. The method according to claim 26 wherein each roller is rotatably supported by two or more roller bearings which comprise at bearing surface mechanism and a bearing housing; wherein each bearing housing is attached to an apparatus frame so as to maintain pressure on said bearing housings in a direction which urges together said first and second rollers.

37. The method according to claim 33 wherein each roller is rotatably supported by two or more roller bearings which comprise a bearing surface mechanism and a bearing housing; wherein each bearing housing is attached to an apparatus frame so as to maintain pressure on said bearing housings in a direction which urges together said first and second rollers.

38. The method according to claim 34 wherein each roller is rotatably supported by two or more roller bearings which comprise a bearing surface mechanism and a bearing housing; wherein each bearing housing is attached to an apparatus frame so as to maintain pressure on said bearing housings in a direction which urges together said first and second rollers.

39. A method of laminating two or more sheet materials together by passing said materials concurrently into a gap between a first roller and a second roller of a laminating apparatus, said first and second rollers being essentially parallel, and said gap having a constant gap width throughout said lamination, wherein a gapping block is positioned between said first and second rollers, said gapping block comprising a rigid gapping block body and four or more load wheels rotatably attached to said gapping block body, wherein said gapping block is positioned such that at least two load wheels contact each roller, the gapping block thereby determining and maintaining a constant gap width.

40. The method according to claim 39 wherein two gapping blocks are positioned between said first and second rollers such that at least two load wheels of each gapping block contact each roller, the gapping blocks thereby determining and maintaining a constant gap width; wherein the two gapping blocks are separated from each other along the length of said rollers by a gap length.

41. The method according to claim 39 wherein each or said rollers comprise at least one pressing zone wherein said roller has a radius $r_p$ and at least one gapping block zone wherein said roller has a radius $r_g$, wherein said load wheels of said gapping blocks contact said rollers at said gapping zone, and wherein $r_p$ is not equal to $r_g$.

42. The method according to claim 41 wherein $r_p$ is greater than $r_g$.

43. The method according to claim 40 wherein each of said rollers comprise at least one pressing zone wherein said roller has a radius $r_p$ and at least two gapping block zones wherein said roller has a radius $r_g$, wherein said load wheels of said gapping blocks contact said rollers at said gapping zones, and wherein $r_p$ is not equal to $r_g$.

44. The method according to claim 43 wherein $r_p$ is greater than $r_g$.

45. The method according to claim 43 wherein said rollers comprise one pressing zone located between two gapping block zones.

46. The method according to claim 44 wherein said rollers comprise one pressing zone located between two gapping block zones.

47. The method according to claim 44 wherein said rollers comprise one pressing zone located between two gapping block zones.

48. The method according to claim 39 wherein said gapping block body has a gapping block body width, which is the linear dimension of the gapping block body measured in the direction parallel to the measurement of the gap width between the first and second rollers, wherein said gapping block body comprises means to adjust said gapping block body width.

49. The method according to claim 48 wherein said gapping block body comprises:

a first gapping block body element, wherein two or more load wheels are rotatably attached to said first gapping block body element;

a second gapping block body element, wherein two or more load wheels are rotatably attached to said second gapping block body element, wherein said second gapping block body element is assembled with said first gapping block body element so as to allow linear motion of the two elements relative to each other in the direction of gapping block body width, and wherein at least one surface of either gapping block body element is canted with respect to a facing surface of the other gapping block body element when so assembled;

a wedge disposed between said canted surface and said facing surface; and an adjusting screw to determine the position of said wedge between said canted surface and said facing surface, thereby determining the gapping block body width.

50. The method according to claim 40 wherein each gapping block body has a gapping block body width, which is the linear dimension of the gapping block body measured in the direction parallel to the measurement of the gap width between the first and second rollers, wherein each gapping block body comprises means to adjust said gapping block body width.

51. The method according to claim 50 wherein said gapping block body comprises:

a first gapping block body element, wherein two or more load wheels are rotatably attached to said first gapping block body element;

a second gapping block body element, wherein two or more load wheels are rotatably attached to said second gapping block body element, wherein said second gapping block body element is assembled with said first gapping block body element so as to allow linear motion of the two elements relative to each other in the direction of gapping block body width, and wherein at least one surface of either gapping block body element is canted with respect to a facing surface of the other gapping block body element when so assembled;

a wedge disposed between said canted surface and said facing surface; and an adjusting screw to determine the position of said wedge between said canted surface and said facing surface, thereby determining the gapping block body width.

52. The method according to claim 45 wherein each gapping block body has a gapping block body width, which is the linear dimension of the gapping block body measured in the direction parallel to the measurement of the gap width between the first and second rollers, wherein each gapping block body comprises means to adjust said gapping block body width.

53. The method according to claim 52 wherein said gapping block body comprises:
a first gapping block body element, wherein two or more load wheels are rotatably attached to said first gapping block body element;
a second gapping block body element, wherein two or more load wheels are rotatably attached to said second gapping block body element, wherein said second gapping block body element is assembled with said first gapping block body element so as to allow linear motion of the two elements relative to each other in the direction of gapping block body width, and wherein at least one surface of either gapping block body element is canted with respect to a facing surface of the other gapping block body element when so assembled;
a wedge disposed between said canted surface and said racing surface; and
an adjusting screw to determine the position of said wedge between said canted surface and said facing surface, thereby determining the gapping block body width.

54. The method according to claim 40 wherein each roller is rotatably supported by two or more roller bearings which comprise a bearing surface mechanism and a bearing housing; wherein each bearing housing is attached to an apparatus frame so as to maintain pressure on said bearing housings in a direction which urges together said first and second rollers.

55. The method according to claim 45 wherein each roller is rotatably supported by two or more roller bearings which comprise a bearing surface mechanism and a bearing housing; wherein each bearing housing is attached to an apparatus frame so as to maintain pressure on said bearing housings in a direction which urges together said first and second rollers.

56. The method according to claim 52 wherein each roller is rotatably supported by two or more roller bearings which comprise a bearing surface mechanism and a bearing housing; wherein each bearing housing is attached to an apparatus frame so as to maintain pressure on said bearing housings in a direction which urges together said first and second rollers.

57. The method according to claim 53 wherein each roller is rotatably supported by two or more roller bearings which comprise a bearing surface mechanism and a bearing housing; wherein each bearing housing is attached to an apparatus frame so as to maintain pressure on said bearing housings in a direction which urges together said first and second rollers.

58. A gapping block comprising:
a first gapping block body element, wherein two or more load wheels are rotatably attached to said first gapping block body element;
a second gapping block body element, wherein two or more load wheels are rotatably attached to said second gapping block body element, wherein said second gapping block body element is assembled with said first gapping block body element so as to allow linear motion of the two elements relative to each other in the direction of gapping block body width, and wherein at least one surface of either gapping block body element is canted with respect to a facing surface of the other gapping block body element when so assembled;
a wedge disposed between said canted surface and said facing surface; and
an adjusting screw to determine the position of said wedge between said canted surface and said facing surface, thereby determining the gapping block body width.

59. The method according to claim 20 wherein at least one of said sheet materials is a polymer electrolyte membrane.

60. The method according to claim 59 wherein said polymer electrolyte membrane is a sulfonated fluoropolymer membrane.

61. The method according to claim 59 wherein said polymer electrolyte membrane has a thickness of 50 micrometers or less.

62. The method according to claim 59 wherein said polymer electrolyte membrane has a thickness of 30 micrometers or less.

* * * * *

UNITED STATES PATENT AND TRADEMARK OFFICE
CERTIFICATE OF CORRECTION

PATENT NO.        : 6,780,276 B2
APPLICATION NO. : 10/115777
DATED             : August 24, 2004
INVENTOR(S)       : Scott A. Ripley It is certified that error appears in the above-identified patent and that said Letters Patent is hereby corrected as shown below:

Title Page
Item (56) References Cited, U.S. Patent Documents, please add the following references that were considered by the Examiner but do not appear on the printed patent:

| | | |
|---|---|---|
| 2,710,234 | 06/1955 | Siegfried |
| 3,359,046 | 12/1967 | Dryden |
| 3,380,788 | 04/1968 | Wilcock |
| 3,477,558 | 11/1969 | Fleischauer |
| 4,286,467 | 09/1981 | Kober |
| 4,819,928 | 04/1989 | Osborn et al. |
| 5,031,002 | 07/1991 | Yaguchi |
| 5,063,415 | 11/1991 | Ariyama |
| 5,133,543 | 07/1992 | Eitel et al. |
| 6,224,203 | 05/2001 | Wotton et al. |
| 6,419,217 | 07/2002 | Hartmann et al. |
| 6,585,846 | 07/2003 | Hanson et al. |

Column 5
Line 10, Claim 3, after " $r_p$ " delete -- , --
Line 12, Claim 3, delete " roller " and insert in place thereof -- rollers --
Line 16, Claim 5, delete " or " and insert in place thereof -- of --
Line 46, Claim 11, delete " in " and insert in place thereof -- to --

Column 7
Line 8, Claim 19,         delete " hearing "
                          and insert in place thereof -- bearing --

Column 8
Line 14, Claim 30,        delete " racing "
                          and insert in place thereof -- facing --

Column 9
Line 16, Claim 36,        delete " at " and insert in place thereof -- a --
Line 54, Claim 41,        delete " or " and insert in place thereof -- of --

UNITED STATES PATENT AND TRADEMARK OFFICE
CERTIFICATE OF CORRECTION

PATENT NO. : 6,780,276 B2
APPLICATION NO. : 10/115777
DATED : August 24, 2004
INVENTOR(S) : Scott A. Ripley It is certified that error appears in the above-identified patent and that said Letters Patent is hereby corrected as shown below:

<u>Column 11</u>
Line 25, Claim 53,   delete " racing "
and insert in place thereof -- facing --

Signed and Sealed this

Tenth Day of July, 2007

JON W. DUDAS
*Director of the United States Patent and Trademark Office*